US012684028B2

(12) United States Patent
Tan et al.

(10) Patent No.: US 12,684,028 B2
(45) Date of Patent: Jul. 14, 2026

(54) DATA PROCESSING METHOD AND RELATED APPARATUS

(71) Applicant: TENCENT TECHNOLOGY (SHENZHEN) COMPANY LIMITED, Shenzhen (CN)

(72) Inventors: Zhihua Tan, Shenzhen (CN); Peng Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 120 days.

(21) Appl. No.: 18/886,399

(22) Filed: Sep. 16, 2024

(65) Prior Publication Data

US 2025/0007970 A1     Jan. 2, 2025

Related U.S. Application Data

(63) Continuation of application No. PCT/CN2023/131397, filed on Nov. 14, 2023.

(30) Foreign Application Priority Data

Dec. 22, 2022     (CN) .......................... 202211658176.7

(51) Int. Cl.
H04L 65/611          (2022.01)
H04L 43/0811          (2022.01)
(Continued)

(52) U.S. Cl.
CPC ........ H04L 65/611 (2022.05); H04L 43/0811 (2013.01); H04L 65/1069 (2013.01); H04L 65/80 (2013.01)

(58) Field of Classification Search
CPC .............. H04L 65/611; H04L 43/0811; H04L 65/1069; H04L 65/80; H04L 65/60; H04L 65/612; H04N 21/44; H04N 21/44012
See application file for complete search history.

(56) References Cited

U.S. PATENT DOCUMENTS

2009/0064248 A1* 3/2009 Kwan ................... H04L 49/555
                                                                725/109
2010/0106508 A1* 4/2010 Malesky, II ......... H04N 21/478
                                                                704/500
(Continued)

FOREIGN PATENT DOCUMENTS

CN          109348257 A     2/2019
CN          111355798 A     6/2020
(Continued)

OTHER PUBLICATIONS

The World Intellectual Property Organization (WIPO) International Search Report for PCT/CN2023/131397 Jan. 23, 2024 5 Pages (including translation).
(Continued)

*Primary Examiner* — El Hadji M Sall
(74) *Attorney, Agent, or Firm* — Anova Law Group, PLLC

(57)          ABSTRACT

This application discloses a data processing method. In a content delivery network including a first terminal device, a second terminal device, and a resource server, the resource server is configured to store and provide a content packet. The method includes acquiring a content packet of first target content from a resource server, the resource server being a server in the content delivery network configured to provide the first target content to the first terminal device; transmitting the content packet to a second terminal device through a data connection with the second terminal device, the second terminal device being an access node of the content delivery network, and the second terminal device initiating an acquisition request for the first target content; obtaining a content picture frame of the first target content based on the content packet; and displaying the content picture frame of the first target content.

20 Claims, 7 Drawing Sheets

(51) Int. Cl.
    H04L 65/1069     (2022.01)
    H04L 65/80     (2022.01)

(56)            References Cited

U.S. PATENT DOCUMENTS

2015/0350115 A1 *  12/2015  Bergman  ............... H04L 1/188
                                                370/216
2021/0344991 A1 *  11/2021  Todd  ....................... G06F 3/017

FOREIGN PATENT DOCUMENTS

CN       114928641 A     8/2022
WO     2020192152 A1   10/2020
WO     2022111027 A1   6/2022

OTHER PUBLICATIONS

Handley, Mark Handley et al., SDP: session description protocol. No. rfc4566. 2006.
Jonathan Rosenberg. Interactive connectivity establishment (Ice): A protocol for network address translator (NAT) traversal for offer/answer protocols. No. rfc5245. 2010.
Rescorla, Eric Rescorla et al., Datagram transport layer security version 1.2. No. rfc6347. 2012.
Singer, David Singer et al., A general mechanism for RTP Header Extensions. No. rfc8285. 2017.

\* cited by examiner

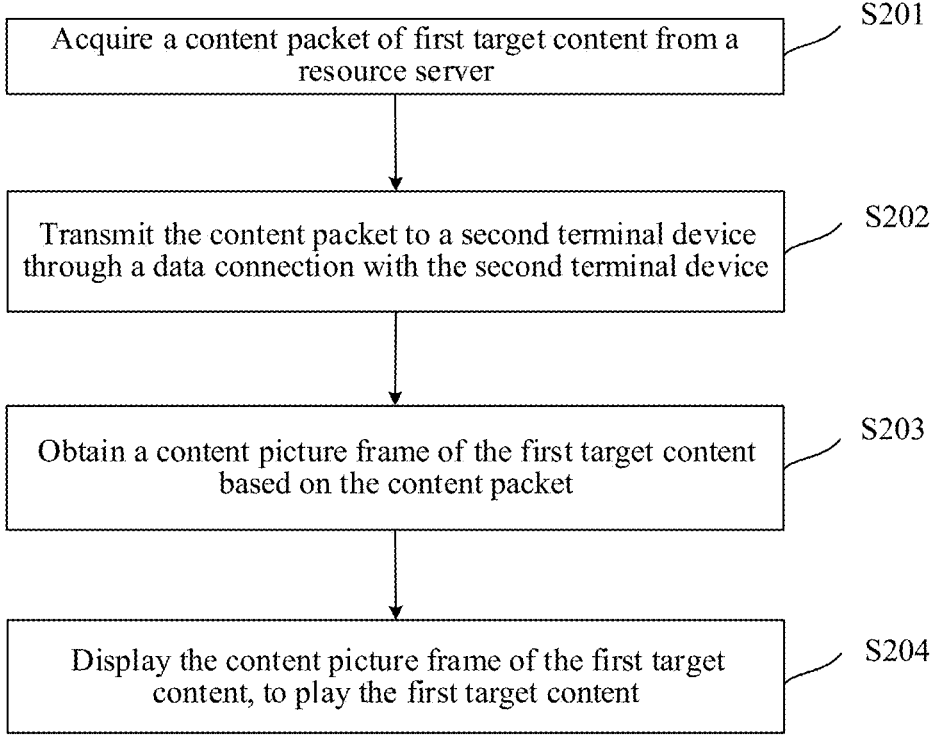

Acquire a content packet of first target content from a resource server — S201

Transmit the content packet to a second terminal device through a data connection with the second terminal device — S202

Obtain a content picture frame of the first target content based on the content packet — S203

Display the content picture frame of the first target content, to play the first target content — S204

FIG. 2

DATA PROCESSING METHOD AND RELATED APPARATUS

RELATED APPLICATIONS

This application is a continuation of PCT Application No. PCT/CN2023/131397, filed on Nov. 14, 2023, which claims priority to Chinese Patent Application No. 2022116581767, entitled "DATA PROCESSING METHOD AND RELATED APPARATUS" filed with the China National Intellectual Property Administration on Dec. 22, 2022, which are incorporated herein by reference in their entirety.

FIELD OF THE TECHNOLOGY

This application relates to the field of data processing, and in particular, to a data transmission technology.

BACKGROUND OF THE DISCLOSURE

A content platform can provide low-latency data transmission services for users through a content delivery network (CDN).

In current content applications with a high real-time requirement, the CDN is often used to provide data transmission services for accessed user nodes. To reduce bandwidth costs of the CDN, a peer to peer (P2P) data sharing method is provided in the CDN. That is, when a plurality of user nodes in the CDN are to acquire target content data, data connections can be established between the user nodes. Through the established data connections, the user nodes that have acquired the target content data from the CDN can share the target content data with the user nodes that have not acquired the target content data.

However, the P2P data sharing method often produces a high latency, and is difficult to adapt to data transmission scenarios with a high real-time requirement.

SUMMARY

To resolve the foregoing technical problem, this application provides a data processing method and a related apparatus, to provide strong transmission support for scenarios with a high real-time requirement.

Embodiments of this application disclose the following technical solutions:

One aspect of this application provides a data processing method. The method is performed by a first terminal device, the first terminal device is an access node of a content delivery network. The method includes acquiring a content packet of first target content from a resource server, the resource server being a server in the content delivery network configured to provide the first target content to the first terminal device; transmitting the content packet to a second terminal device through a data connection with the second terminal device, the second terminal device being an access node of the content delivery network, and the second terminal device initiating an acquisition request for the first target content; obtaining a content picture frame of the first target content based on the content packet; and displaying the content picture frame of the first target content.

According to another aspect, an embodiment of this application provides a computer device, including a processor and a memory, the memory being configured to store program code and transmit the program code to the processor;

and the processor being configured to perform the method described above based on instructions in the program code.

According to another aspect, an embodiment of this application provides a non-transitory computer-readable storage medium, configured to store a computer program, the computer program being configured to perform the method according to the foregoing aspect.

From the foregoing technical solutions, in the content delivery network including the first terminal device, the second terminal device, and the resource server, when first target content needs to be viewed through the first terminal device, the first terminal device can acquire the content packet of the first target content from the resource server. For the second terminal device that also initiates the acquisition request for the first target content, based on the data connection between the first terminal device and the second terminal device, to reduce bandwidth consumption of the content delivery network. The first terminal device can push the content packet acquired from the resource server to the second terminal device through the data connection, so that the second terminal device obtains the content picture frame of the first target content through the content packet. By decoupling frame rendering and data sharing, the timing for the first terminal device to push the content packet no longer depends on whether the first terminal device has obtained the content picture frame based on the content packet and rendered the content picture frame. In other words, the first terminal device can quickly and directly push the content packet to the second terminal device without waiting for itself to complete generation and rendering of the content picture frame, thereby greatly improving the efficiency of data sharing between terminal devices. A latency between the first target content viewed through the second terminal device and the first target content viewed through the first terminal device is reduced, which provides strong transmission support.

BRIEF DESCRIPTION OF THE DRAWINGS

FIG. 2 is a flowchart of a data processing method according to an embodiment of this application.

DESCRIPTION OF EMBODIMENTS

Figure 1:
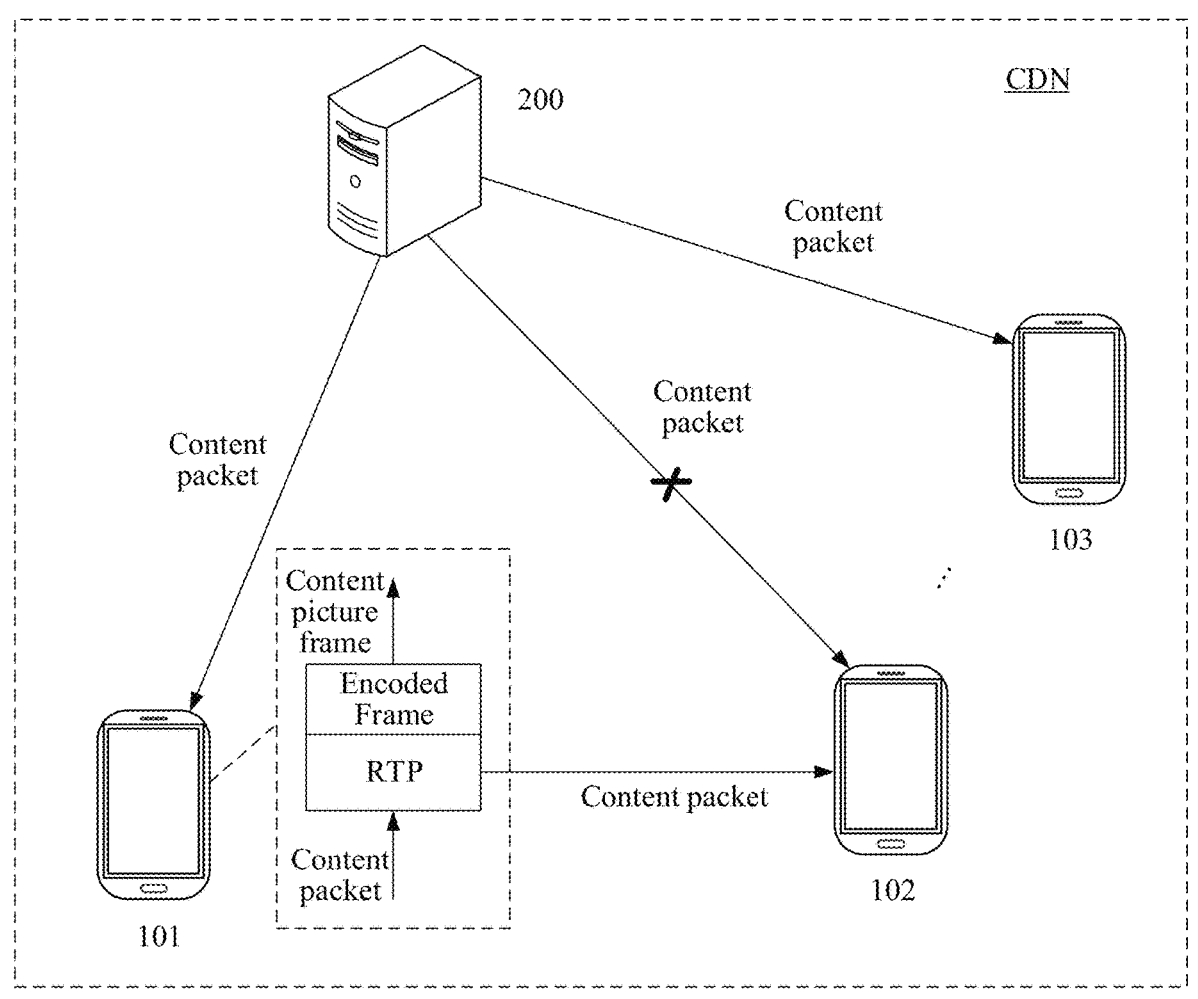
FIG. 1 is a schematic diagram of a data processing scenario according to an embodiment of this application.

The following describes the embodiments of this application with reference to the accompanying drawings.

In a content delivery network, an access node may acquire content provided by the network from a resource server of the network. To reduce network bandwidth consumption, a P2P data sharing method is proposed, that is, an access node in a network serves as a sharing source for sharing content that the access node has acquired with some access nodes with a content acquiring requirement. However, in content scenarios with a real-time high requirement (for example, a live streaming scenario), the P2P data sharing method produces a high latency.

The reason is that a data sharing provider generally shares a content packet with a data sharing acquirer only after a corresponding content picture frame is generated based on the content packet. This causes a waiting time for each sharing of the content packet, that is, waiting for the provider to generate the content picture frame based on the content packet. As a result, the content packet acquired by the acquirer through data sharing lags to some extent, resulting in a latency in the content picture frame seen, for example, a few seconds later than the content progress viewed directly through the resource server.

In content scenarios with a high real-time requirement, the latency is unbearable and greatly affects user experience of viewing content. As a result, the P2P data sharing method is difficult to adapt to data transmission scenarios with a high real-time requirement.

Therefore, the embodiments of this application provide a data processing method, so that the P2P data sharing method can be applied to scenarios with a high real-time requirement, which provides strong transmission support for the scenarios with a high real-time requirement.

The data processing method provided in the embodiments of this application may be implemented by a computer device. The computer device may be a terminal device or a server. The server may be an independent physical server, or may be a server cluster including a plurality of physical servers or a distributed system, or may be a cloud server providing cloud computing services. The terminal device includes but is not limited to a mobile phone, a computer, a smart voice interaction device, a smart home appliance, an in-vehicle terminal, an aircraft, an extended reality (XR) device, and the like. The terminal device and the server may be connected directly or indirectly in a wired or wireless communication manner. This is not limited in this application.

The embodiments of this application may be applied to a cloud technology, for example, cloud storage. The cloud storage is a new concept extended and developed from a cloud computing concept. A distributed cloud storage system (hereinafter referred to as a storage system) refers to a storage system that integrates, through functions such as a cluster application, a grid technology, and a distributed storage file system, a large quantity of different types of storage devices (the storage devices are also referred to as storage nodes) in a network to work in cooperation through application software or application interfaces, to jointly provide data storage and service access functions to the outside.

Currently, a storage method of the storage system is to create a logical volume. During creation of the logical volume, a physical storage space is allocated to each logical volume. The physical storage space may be formed by disks of a storage device or several storage devices. A client stores data on a logical volume, that is, stores the data on a file system. The file system divides the data into many parts, and each part is an object. The object includes not only the data but also additional information such as a data identifier (ID). The file system writes each object to the physical storage space of the logical volume separately, and the file system records storage location information of each object. Therefore, when the client requests to access the data, the file system can allow the client to access the data based on the storage location information of each object.

A process of the storage system allocating the physical storage space to the logical volume is specifically: dividing the physical storage space into stripes in advance based on a capacity estimate of an object stored in the logical volume (the estimate usually has a large margin relative to a capacity of an object to be stored) and a group of a redundant array of independent disks (RAID). One logical volume may be understood as one stripe, so that the physical storage space is allocated to the logical volume.

For example, a CDN in the embodiments of this application may be set up through the cloud, content in the CDN is carried in a resource server through cloud storage, and the resource server may provide required content to an access node in the CDN through a cloud environment. The embodiments of this application may also be applied to other scenarios related to the cloud technology, for example, data transmission scenarios with a high real-time requirement such as cloud live streaming.

FIG. 1 is a schematic diagram of a data processing scenario according to an embodiment of this application. The CDN includes a resource server 200, and a plurality of terminal devices serving as access nodes. A terminal device 101, a terminal device 102, and a terminal device 103 are exemplarily shown. In the following embodiments, an example in which the terminal device 101 serves as a first terminal device and the terminal device 102 serves as a second terminal device is used as an example for description.

Both the terminal device 101 and the terminal device 102 need to acquire first target content, for example, live streaming content of a live streaming room a through the CDN. Therefore, the terminal device 101 and the terminal device 102 may acquire a content packet corresponding to the live streaming content from the resource server 200.

When there is a data connection between the terminal device 101 and the terminal device 102, because the terminal device 101 and the terminal device 102 acquire the same live streaming content, P2P data sharing may be performed, to reduce bandwidth consumption of the CDN.

In this application, by decoupling frame rendering and data sharing, the timing for the first terminal device to push the content packet no longer depends on whether the first terminal device has obtained the content picture frame based on the content packet and rendered the content picture frame. For example, a Real-Time Transport Protocol (RTP) layer and an Encoded Frame layer are set in the terminal device 101. The terminal device 101 may directly push content packets pulled from the resource server 200 to the terminal device 102 through the RTP layer based on the data connection between the terminal device 101 and the terminal device 102. The Encoded Frame layer of the terminal device 101 assembles the content packets pulled from the resource server 200 to obtain the content picture frame, and then renders the live streaming content based on the content picture frame.

However, in the related art, because the frame rendering and the data sharing are not decoupled, the terminal device 101 needs to acquire the content picture frame through assembly based on the content packet before sharing the data with another terminal device. Collecting the content packet for assembly and generating the content picture frame are time-consuming. As a result, the P2P data sharing in the CDN has a high latency, and is difficult to adapt to transmission scenarios with a high real-time requirement, for example, the foregoing live streaming scenario.

However, in this application, the first terminal device can quickly and directly push the content packet to the second terminal device without waiting for itself to complete generation and rendering of the content picture frame, thereby greatly improving the efficiency of data sharing between terminal devices. A latency between the first target content viewed through the second terminal device and the first target content viewed through the first terminal device is effectively reduced, which provides strong transmission support for scenarios with a high real-time requirement.

Correspondingly, after acquiring the content packet shared through P2P from the terminal device 101, the terminal device 102 may disconnect a data connection between the terminal device 102 and the resource server 200. For example, as shown by a cross on the data connection between the terminal device 102 and the resource server 200 in FIG. 1, the live streaming content related to the live streaming room a is no longer acquired from the resource server 200, thereby reducing the bandwidth consumption of the CDN.

FIG. 2 is a method flowchart of a data processing method according to an embodiment of this application. The method is performed by a first terminal device and the method includes:

S201: Acquire a content packet of first target content from a resource server.

The first target content is content with a real-time requirement. The real-time requirement may be understood as: it is required that a content progress displayed by a content provider of the first target content is basically synchronized with a content progress displayed by a content acquirer of the first target content based on the content data package of the first target content. The basic synchronization may be understood as a time difference between the content progress displayed by the content provider and the content progress displayed by the content acquirer being less than a preset time difference.

A specific form of the first target content is not limited in this application. For example, the first target content may be live streaming content of cloud live streaming. Therefore, in a possible implementation, the first target content is live streaming content for a target live streaming room.

Because a live streaming form has a real-time high requirement, content watched by a user who needs to watch a live stream is basically synchronized with live streaming content provided by a live streamer. If the latency is high, the live streaming content provided by the live streamer and the live streaming content watched by the user through a terminal device are out of sync. For example, when the live streamer plays a video, the playing progress on the live streamer side is the $50^{th}$ second of the video. However, due to the latency, what the user watches through the terminal device may be the $40^{th}$ second of the video. This latency greatly reduces the interaction efficiency and viewing experience during the live stream.

However, the P2P data sharing method provided in this application can greatly reduce the latency. The second terminal device renders the live streaming content through the content packet shared by the first terminal device. The rendered live picture frame can also be basically synchronized with the live streaming content of the target live streaming room, providing a good live streaming interaction experience in the cloud live streaming scenario of the CDN.

The content packet of the first target content is in a data form of the first target content in a transmission process.

Generally, one content picture frame of the first target content is split and packaged into a plurality of content packets.

As described above, a plurality of terminal devices including the first terminal device and the second terminal device are connected to the CDN of this application. The first terminal device may be the foregoing terminal device 101, and the second terminal device may be the foregoing terminal device 102.

The resource server in the CDN is configured to provide various types of content, such as the first target content, for the access device. Because the CDN is characterized by nearby transmission, the resource server in this application may be one server or a plurality of servers. This is not limited herein.

S202: Transmit the content packet to a second terminal device through a data connection with the second terminal device.

The second terminal device is an access node of the content delivery network, and the second terminal device also initiates an acquisition request for the first target content.

The acquisition request may be defined by whether to request to acquire the content packet of the first target content from the resource server. If the second terminal device starts to acquire the content packet of the first target content from the resource server, it may be determined that the second terminal device has the need to acquire the first target content. If the second terminal device does not acquire the content packet of the first target content from the resource server, it may be determined that the second terminal device does not have the need to acquire the first target content.

For example, the first target content is live streaming content. When the user enters a live streaming room corresponding to the live streaming content through a terminal device, the terminal device correspondingly starts to acquire a content packet of the live streaming content from the resource server.

Because there is a data connection between the first terminal device and the second terminal device, and both the first terminal device and the second terminal device have the need to acquire the first target content, in this case, the first terminal device can directly push the content packet pulled from the resource server to the second terminal device based on the data connection with the second terminal device. The second terminal device can obtain a content picture frame of the first target content through assembly based on the content packet acquired from the first terminal device and render the content picture frame of the first target content, thereby viewing the first target content.

S203: Obtain a content picture frame of the first target content based on the content packet.

This application does not limit execution of S203 to be after S202. For some first terminal devices with strong processing capabilities, or in a transmission environment with good network quality, S202 and S203 may also be performed in parallel by the first terminal device.

As described above, by decoupling frame rendering and data sharing in this application, the timing for the first terminal device to push the content packet does not depend on whether the first terminal device has obtained the content picture frame based on the content packet and rendered the content picture frame. Therefore, when data sharing needs to be performed, the first terminal device can push the content packet to the second terminal device through the data connection between the first terminal device and the second terminal device as soon as it receives the content packet.

Because the latency for the second terminal device to acquire the content packet from the first terminal device is very small compared to the first terminal device acquiring the content packet from the resource server, after the second terminal device generates the content picture frame based on the content packet and renders the content picture frame, the displayed content progress may be basically consistent with the progress of the first target content, thereby achieving a low-latency effect, so that the data sharing method can effectively adapt to various content transmission scenarios with a high real-time requirement, for example, live streaming and fast live streaming.

Because the content packet of the first target content is a transmission form of the first target content, the first terminal device needs to obtain the content picture frame of the first target content based on the content packet before rendering. The content picture frame may include video information and/or audio information of the first target content. This is not limited in this application. Generally, the content packet of the first target content is an encoded packet acquired by the resource server encoding the content picture frame of the first target content. When obtaining the content picture frame of the first target content based on the content packet, the first terminal device first needs to decode the content packet through a decoder to acquire original data (that is, data before encoding) of the content picture frame of the first target content, and then invoke a related image rendering module to perform image rendering based on the original data, to acquire the content picture frame of the first target content. After acquiring the content packet of the first target content, the second terminal device also needs to acquire the content picture frame of the first target content through rendering in the same implementation.

In some cases, one content picture frame during transmission is encapsulated into a plurality of content packets. Therefore, in a possible implementation, S203 includes: obtaining, when acquiring all content packets for the content picture frame, the content picture frame of the first target content based on the all content packets.

In this case, when pulling the content packet from the resource server, the first terminal device may determine, based on information carried in the content packet, whether a plurality of content packets for the same content picture frame are all obtained, and after the plurality of content packets are all acquired, start assembly based on the all content packets, to obtain the corresponding content picture frame. For example, it is assumed that a content picture frame is encapsulated into five content packets. After acquiring the five content packets corresponding to the content picture frame, the first terminal device may decode and splice the five content packets through a decoder to obtain original data of the content picture frame, and then invoke a related image rendering module to perform rendering based on the original data, to obtain the content picture frame.

For this scenario, in the P2P data sharing in the related art, the first terminal device needs to wait for itself to pull all content packets before generating the content picture frame. Data sharing of the content packets can be performed only after the content picture frame is generated, causing a more severe latency in the P2P data sharing in the related art. However, in this application, although the first terminal device also needs to wait for itself to pull all content packets of one content picture frame before obtaining the content picture frame, frame rendering and data sharing are decoupled. Therefore, the timeliness of directly pushing the pulled content packets to the second terminal device is not affected.

S204: Display the content picture frame of the first target content, to play the first target content.

After obtaining the content picture frame, the first terminal device may render and display the content picture frame on a display area of the first terminal device, so that the user of the first terminal device watches the first target content through the display area. Generally, the first target content is formed by a plurality of content picture frames. The first terminal device can render and display the content picture frames in the first target content one by one, to play the first target content.

To improve smoothness of rendering of the content picture frame, in the embodiments of this application, the content picture frame generated based on the content packet may be buffered through a buffer, thereby avoiding unnatural display effects such as jumping and freezing of the rendered content.

Therefore, in a possible implementation, the first terminal device loads the content picture frame of the first target content into the buffer.

Correspondingly, S204 includes: reading and displaying the content picture frame of the first target content sequentially from the buffer, to play the first target content.

The buffer may be a jitterbuffer. The jitterbuffer is also referred to as a jitter buffer area. The jitterbuffer is an important module in a real-time audio and video, and is configured to process packet loss, out-of-order packets, delayed arrival, and the like, smoothly output a packet/frame to a decoding module, resist the impact of various weak network statuses on playing/rendering, alleviate the freezing, and improve watching experience of the user.

In the content delivery network including the first terminal device, the second terminal device, and the resource server, when the first target content needs to be viewed through the first terminal device, the first terminal device can acquire the content packet of the first target content from the resource server. For the second terminal device that also initiates the acquisition request for the first target content, due to the data connection between the first terminal device and the second terminal device, to reduce bandwidth consumption of the content delivery network, the first terminal device can push the content packet acquired from the resource server to the second terminal device through the data connection, so that the second terminal device obtains the content picture frame of the first target content through the content packet. By decoupling frame rendering and data sharing, the timing for the first terminal device to push the content packet no longer depends on whether the first terminal device has obtained the content picture frame based on the content packet and rendered the content picture frame. In other words, the first terminal device can quickly and directly push the content packet to the second terminal device without waiting for itself to complete generation and rendering of the content picture frame, thereby greatly improving the efficiency of data sharing between terminal devices. A latency between the first target content viewed through the second terminal device and the first target content viewed through the first terminal device is effectively reduced, which provides strong transmission support for scenarios with a high real-time requirement.

Before the data sharing, a sharing mechanism needs to be established. For example, a subscription negotiation for the first target content is established between the first terminal device and the second terminal device.

In a possible implementation, the method further includes the following operations.

S11: Transmit a data sharing request to the second terminal device, the data sharing request being configured for identifying the first terminal device as a data sharing provider corresponding to the first target content.

S12: Acquire a data sharing response of the second terminal device.

S13: When the data sharing response indicates that the second terminal device receives sharing, perform the foregoing operation S202.

The subscription negotiation may be implemented through the data sharing request and the data sharing response that are interacted between the first terminal device and the second terminal device. In other words, in this scenario, the second terminal device may receive the data sharing request transmitted by the first terminal device. If a user of the second terminal device triggers, for the data sharing request, an operation of agreeing to receive sharing, it indicates that the user of the second terminal device agrees to receive the packet of the first target content provided by the first terminal device. In this case, the second terminal device may generate the data sharing response for indicating that the second terminal device receives sharing, and feedback the data sharing response to the first terminal device. Accordingly, only when the user of the second terminal device agrees to receive sharing, the second terminal device can use the first terminal device as a subscriber, that is, a sharing provider, of the first target content, and the first terminal device can perform P2P data sharing on the second terminal device. In the P2P data sharing, the second terminal device serves as a data sharing acquirer corresponding to the first target content.

Through the foregoing subscription negotiation mechanism, that is, through the interaction of the data sharing request and the data sharing response between the first terminal device and the second terminal device, security of the P2P data sharing can be improved. The user of the second terminal device can select the data sharing provider. For example, the user can select a data sharing provider that better meets the needs of the user from a plurality of pending data sharing providers to perform the P2P data sharing, and reject a data sharing provider that does not meet the needs of the user.

In addition, when the P2P data sharing is not required, the second terminal device may reject to acquire the content packet of the first target content from another terminal device in the CDN, for example, the first terminal device, for sharing, but still acquire the content packet of the first target content from the resource server, which is more autonomous.

The data sharing request and the data sharing response used in the foregoing subscription negotiation may be directly interacted between the first terminal device and the second terminal device, or may be forwarded through another device for interaction. This is not limited in this application.

For example, when there is a data connection between the first terminal device and the second terminal device, the subscription negotiation may be directly performed through the data connection. Certainly, even when there is a data connection between the first terminal device and the second terminal device, indirect subscription negotiation may be performed through another device.

Therefore, in a possible implementation, S11 includes: transmitting the data sharing request to the second terminal device through a seed server in the content delivery network; and S12 includes: acquiring the data sharing response of the second terminal device through the seed server.

The seed server may be a tracker/stun server in the CDN. The seed server is configured to maintain a content access requirement of a terminal device in the CDN, that is, maintain which terminal devices in the CDN have the need to access target content. An advantage of forwarding the data sharing request and the data sharing response through the seed server is that first, the seed server itself maintains information that the terminal device accesses the first target content, and therefore, the forwarding can be accurately completed based on the maintained information. Moreover, because there is no need for the first terminal device and the second terminal device to directly interact, a more secure seed server is used for forwarding, thereby effectively improving security of the subscription negotiation.

As described above, the seed server may be configured to maintain the content access requirement of the terminal device in the CDN. Because massive terminal devices are connected to the CDN, pulling requirements of different terminal devices for target content may also change at any time. To accurately perform the P2P data sharing provided in the embodiments of this application, the first terminal device needs to be able to accurately learn which terminal devices are pulling the same first target content as the first terminal device.

Therefore, in a possible implementation, the method further includes:

S20: Acquire a sharing list corresponding to the first target content, the sharing list including an identification information set of a terminal device in the content delivery network that requests to acquire the first target content, the identification information set including identification information of the second terminal device.

Correspondingly, S202 of transmitting the content packet to a second terminal device through a data connection with the second terminal device includes:

transmitting the content packet to the second terminal device through the data connection with the second terminal device based on the sharing list.

When any terminal device in the CDN starts to access the first target content, the seed server records and adds identification information of the terminal device to the sharing list corresponding to the first target content. When the terminal device no longer accesses the first target content, the seed server removes the identification information of the terminal device from the sharing list.

In other words, the sharing list is updated in real time by the seed server based on an access status of the terminal device for the first target content. The first terminal device may clearly learn, through the sharing list, which terminal devices have started to access the first target content. After the second terminal device is determined, the first terminal device may push the content packet to the second terminal device through the data connection between the first terminal device and the second terminal device based on related information of the second terminal device identified in the sharing list, thereby improving reliability of the data sharing.

To enable the seed server to maintain the sharing list dynamically in real time, in this application, the terminal device may report related feedback information to the seed server when pulling the first target content from the resource server.

In a possible implementation, before S20, the method further includes:

transmitting feedback information to the seed server in the content delivery network, the feedback information including identification information of the first target content and identification information of the first terminal device, and the feedback information being configured for indicating the seed server to generate the sharing list based on the feedback information.

When accessing the first target content, the first terminal device starts to acquire the first target content from the resource server, that is, acquire the content packet of the first target content. To enable the seed server to maintain the sharing list dynamically in real time, the first terminal device transmits the feedback information carrying the identification information (for example, a channel) of the first target content and the identification information (for example, name) of the first terminal device to the seed server, to inform the seed server of the access status of the first terminal device. The seed server may update sharing lists corresponding to different target content based on the feedback information transmitted by the terminal devices in the CDN.

The updating not only includes adding the identification information of the first terminal device to the sharing list corresponding to the first target content, but may also include removing the identification information of the first terminal device from sharing lists of other target content. For example, the first terminal device originally accesses the second target content, the first terminal device accesses the first target content instead based on an access requirement or another access condition. In this case, the seed server may add the identification information of the first terminal device to the sharing list corresponding to the first target content based on the feedback information sent by the first terminal device to access the first target content, and remove the identification information of the first terminal device from the sharing list corresponding to the second target content.

Because the access requirement of the terminal device in the CDN may change at any time, the terminal device transmits the feedback information to the seed server based on the access status of the terminal device, so that the seed server can update the sharing list as soon as possible, and accurately reflects a current access status of the target content, thereby ensuring high accuracy of the sharing list.

As described above, the first terminal device shares content packet with the second terminal device through the data connection between the first terminal device and the second terminal device. The following describes the establishment of the data connection.

Before determining the data sharing acquirer of the content packet, the first terminal device needs to determine whether the second terminal device is connectable.

In a possible implementation, the method further includes the following operations.

S31: Perform a connectivity test on the second terminal device.

S32: Establish the data connection with the second terminal device if a test result of the connectivity test indicates that the second terminal device meets a connection condition.

A specific method of the connectivity test is not limited in the embodiments of this application, for example, the connectivity test method may be a ping method. Whether there is a connection condition between the first terminal device and the second terminal device may be determined through the connectivity test, and the data connection is established when it is determined that there is a connection condition between the second terminal device and the first terminal device, that is, it is determined that the second terminal device is connectable. The connection condition is a preset condition for measuring whether a data connection can be established between two terminal devices. For example, the communication quality of a data communication link between the two terminal devices meets a preset communication quality requirement. In another example, a communication cost between the two terminal devices is less than a preset cost threshold, and so on. This may be set based on a requirement and is not limited in the embodiments of this application.

For example, when acquiring the sharing list for the first target content from the seed server, the first terminal device may perform the connectivity test on these terminal devices separately based on identification information of the terminal devices in the sharing list, where any terminal device that meets the connection condition and that is determined through the connectivity test may be used as the second terminal device.

The connectivity test may be directly performed on the second terminal device by the first terminal device, or may be performed by another device. This is not limited in this application.

Shareable terminal devices and non-shareable terminal devices can be effectively selected through the connectivity test, thereby improving establishment efficiency and stability of the data connection.

In the foregoing embodiments, an implementation of the data sharing is mainly described from a perspective of the first terminal device being the data sharing provider. Next, an example in which the first terminal device is a data sharing receiver is used to describe a related processing manner of the data sharing receiver. For ease of distinction, in this scenario, the first terminal device acquires a content packet of second target content from the resource server. The second target content may be the same as or may be different from the foregoing first target content.

In a possible implementation, the method further includes the following operations.

S31: Acquire a content packet of second target content from the resource server.

S32: Acquire the content packet of the second target content from a third terminal device through a data connection with the third terminal device, the third terminal device being an access node of the content delivery network.

S33: Disconnect the data connection with the resource server for transmitting the content packet of the second target content.

In this scenario, the first terminal device and the third terminal device have the same content access requirement, that is, both the first terminal device and the third terminal device have started to access the second target content. The third terminal device serves as a data sharing provider to push the content packet of the second target content provided by the resource server to the first terminal device.

Because the first terminal device has acquired the required content packet through the data connection with the third terminal device, to reduce bandwidth overheads of the CDN, the first terminal device may disconnect the data connection originally between the first terminal device and the resource server for pulling the second target content, which does not affect the progress of the first terminal device acquiring the second target content.

As described above, one content picture frame may be formed by a plurality of content packets. The terminal device can restore a content picture frame for rendering only after all content packets of one content picture frame are acquired. Therefore, in the P2P data sharing solution, this application provides an implementation that can improve reliability of the data sharing.

In a possible implementation, S33 includes:

disconnecting, in response to acquiring all content packets of one content picture frame of the second target content from the third terminal device, the data connection with the resource server for transmitting the content packet of the second target content.

In other words, when the first terminal device acquires all content packets that can generate one content picture frame from the third terminal device, it may be determined to some extent that connection quality of the data connection between the first terminal device and the third terminal device is stable and can respond to a network data transmission requirement required for the P2P data sharing. In this case, the first terminal device may disconnect the data connection with the resource server for the second target content.

If the first terminal device cannot acquire all content packets that can generate one content picture frame from the third terminal device, for example, packet loss occurs and the transmission speed is excessively low, it may be determined that the connection quality of the data connection between the first terminal device and the third terminal device is unstable and is difficult to respond to the network data transmission requirement required for the P2P data sharing. In this case, the first terminal device may temporarily not disconnect the data connection with the resource server for the second target content, and further identify sharing feasibility of the data connection with the third terminal device.

The data processing method provided in the embodiments of this application may be applied to WebRTC-based live streaming P2P data sharing.

WebRTC is short for Web Real-Time Communication, is W3C and IETF standards, and is applied to real-time audio and video communication. Live streaming P2P means that when a plurality of users are watching the same live streaming room (or live streaming channel), terminal devices used by the plurality of users to watch live streaming content may establish connections with each other and share data with each other, thereby reducing bandwidth costs of the resource server that provides the live streaming content.

Figure 3:
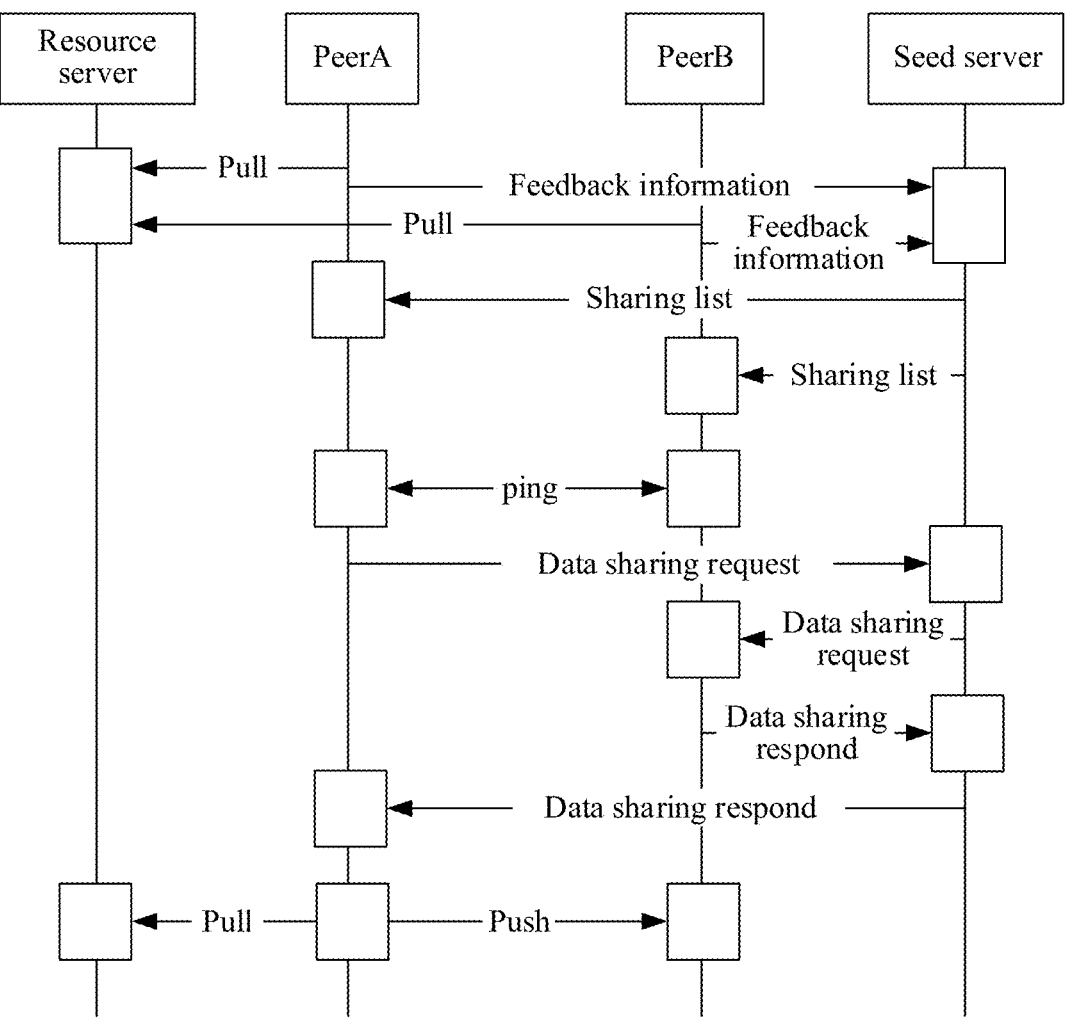
FIG. 3 is a signaling diagram of data sharing according to an embodiment of this application.

The scenario shown in FIG. 3 includes a resource server (a live streaming source in the CDN), a seed server, PeerA, and PeerB in the CDN. PeerA may be the foregoing first terminal device, and PeerB may be the foregoing second terminal device. Peer is a node of a P2P network. In the embodiments of this application, any terminal device that uses P2P to watch a live stream is Peer in the P2P network.

Operation 1: PeerA/PeerB directly pulls a latest live stream (for example, the first target content) from the resource server after starting a corresponding content application.

Operation 2: After starting to pull the live stream, PeerA/PeerB reports feedback information to the seed server, where the feedback information includes information such as a channel (a content identifier of the first target content) and Peername (a terminal identifier of PeerA/PeerB).

Operation 3: The seed server delivers a sharing list (peerlist) corresponding to the live stream in operation 1 to PeerA/PeerB based on information such as a region, a computer room, and a channel of the access node in the CDN.

Because the live streams accessed by PeerA/PeerB are the same, a sharing list acquired by PeerA includes information of PeerB, and a sharing list acquired by PeerB includes information of PeerA.

Operation 4: PeerA selects PeerB in the sharing list to perform a ping operation (a connectivity test), which may be direct ping or ping forwarded by an intermediate device, to determine whether PeerA and PeerB can communicate with each other.

Operation 5: After PeerA and PeerB can ping each other, PeerA initiates a WebRTC subscription to PeerB. First, PeerA initiates a data sharing request (an offer subscription) to PeerB. After receiving the data sharing request of PeerA, PeerB generates a corresponding data sharing response (answer) and returns it to PeerA. In FIG. 3, the data sharing request and the data sharing response are forwarded through the seed server for interaction.

After PeerA receives the data sharing response, the subscription pair (PeerA/PeerB) may perform the data sharing.

Operation 6: PeerA pushes a latest content packet (live streaming media data) of the live stream pulled from the resource server to PeerB after the subscription pair is established. After receiving the complete live streaming data transmitted by PeerA, PeerB closes the data connection between PeerB and the resource server for the live stream.

Figure 4:
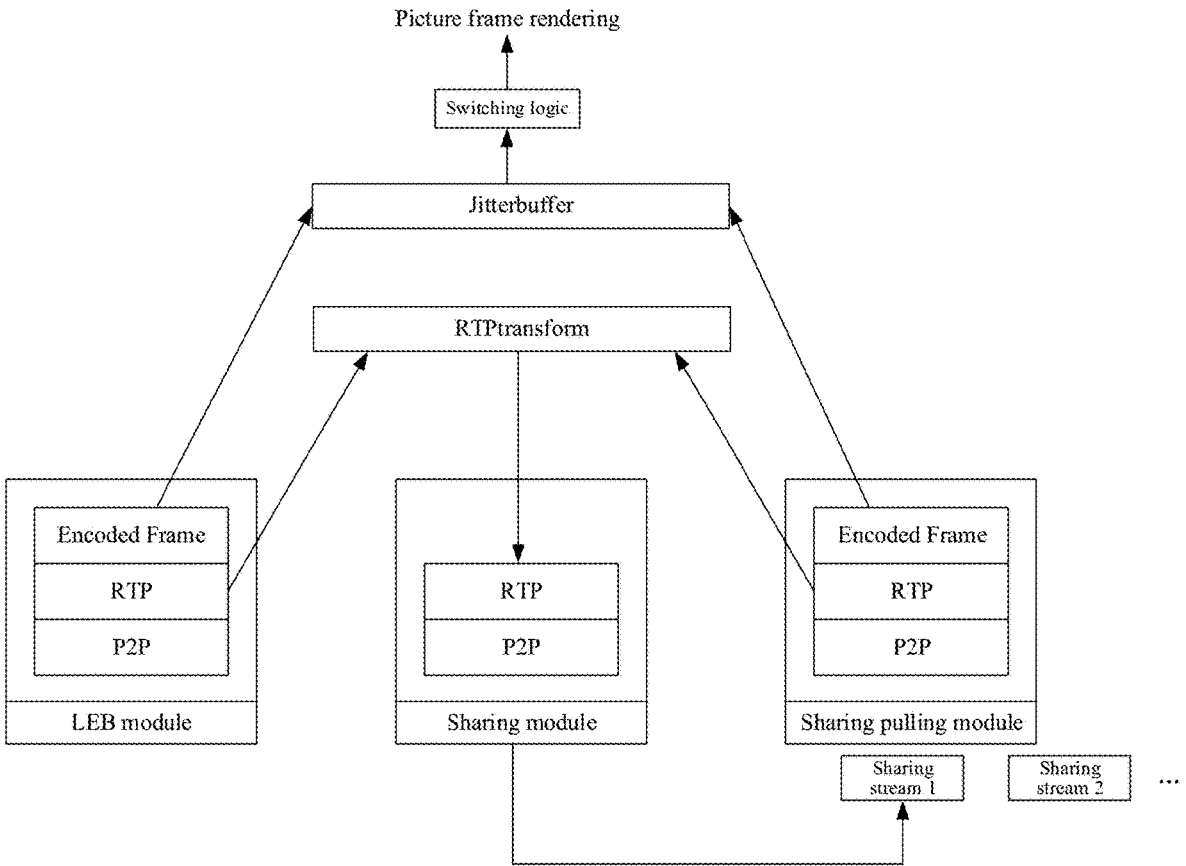
FIG. 4 is a transmission architecture diagram of data sharing according to an embodiment of this application.

The following continues the description from a transmission framework perspective of the terminal device. As shown in FIG. 4, from the transmission framework perspective, the terminal device may be divided into three parts: an LEB module (CDNReceiver) configured to pull the content packet from the resource server; a sharing module (P2PSender) configured to perform data sharing, to push the content packet pulled by the LEB module from the resource server to another terminal device; and a sharing pulling module (P2PReceiver) configured to acquire the content packet of the data sharing, to acquire the pushed content packet from the another terminal device.

In addition, the transmitted data is layered. Each layer performs its own duties to ensure low-latency sharing and smooth playing of the entire P2P transmission module.

The first terminal device first divides the live streaming data (the content packet) pulled by the LEB module from the resource server into an RTP layer and an Encoded Frame layer of the LEB module, and inputs the Encoded Frame layer into jitterbuffer for smooth outputting, to achieve smooth playing. Data (the content packet) of the RTP layer is directly forwarded to the sharing module of the first terminal device through RTPTransform, and then forwarded to the second terminal device. After receiving the content packet pushed by the sharing module of the first terminal device, the sharing pulling module of the second terminal device assembles the content packet into Encoded Frame, and also inputs Encoded Frame into a JitterBuffer layer, and the JitterBuffer layer outputs smooth audio and video frames to an upper-layer player.

The first terminal device may also acquire the pushed content packet from the third terminal device through the sharing pulling module of the first terminal device, and assembles the pushed content packet into Encoded Frame and inputs Encoded Frame into the Jitterbuffer layer. In this case, for example, for the second target content, the Jitterbuffer layer includes both the content packet pulled by the LEB module from the resource server and the content packet acquired by the sharing pulling module from the third terminal device. In this case, the first terminal device may determine, through switching logic, which Encoded Frame is used to render the content picture frame for the second target content.

Figure 5:
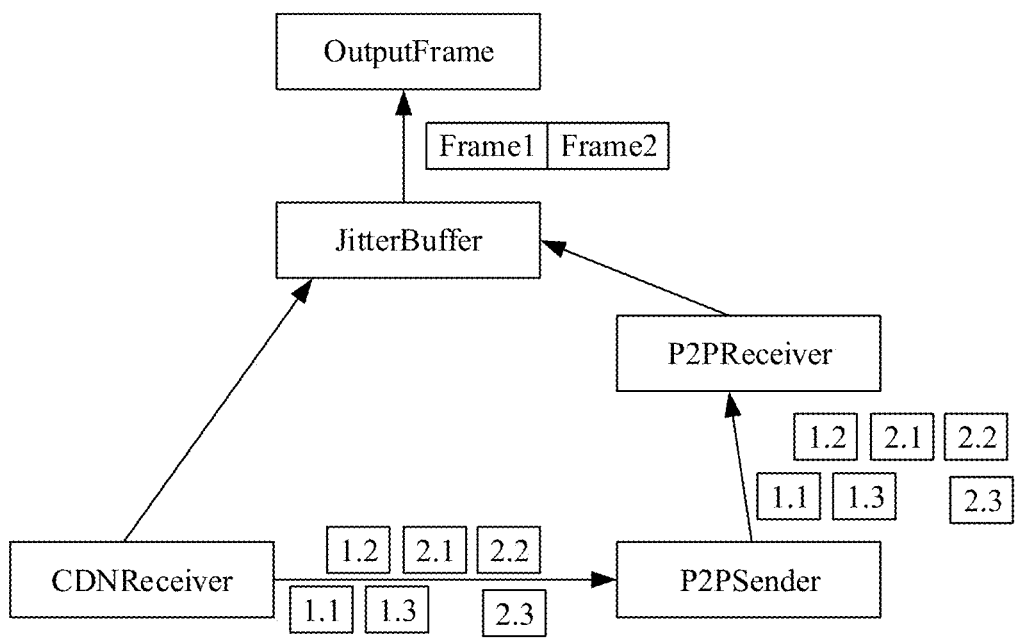
FIG. 5 is a schematic diagram of transmission of a content packet in a data sharing scenario according to an embodiment of this application.
Figure 6:
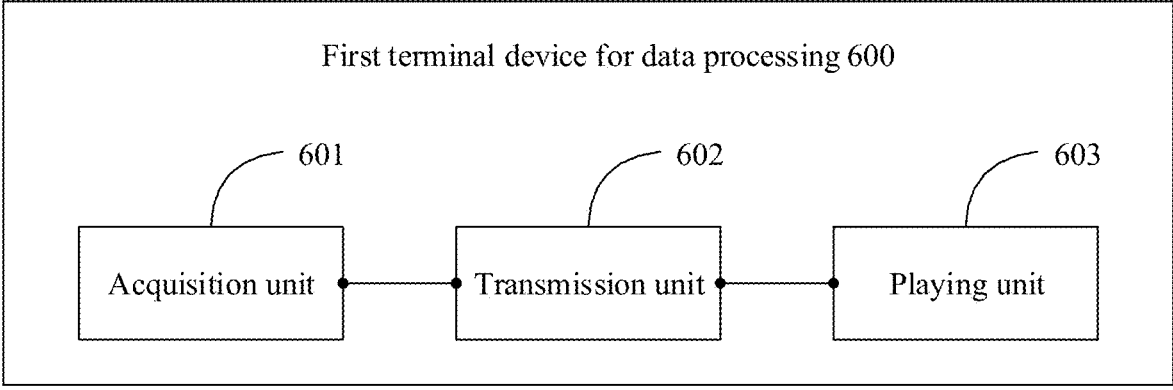
FIG. 6 is an apparatus structural diagram of a first terminal device for data processing according to an embodiment of this application.

FIG. 5 shows a specific content packet transmission scenario. In the scenario in FIG. 5, one content picture frame (Frame) is encapsulated into three content packets. In this scenario, two content picture frames, Frame1 and Frame2, are used as an example. Frame1 is encapsulated into three content packets: 1.1, 1.2, and 1.3 respectively, and Frame2 is encapsulated into three content packets: 2.1, 2.2, and 2.3 respectively.

In the first terminal device, when CDNReceiver serving as the LEB module pulls the content packets from the resource server, the content packets may be pushed to P2PSender serving as the sharing module. P2PSender pushes the content packets to the second terminal device. In the second terminal device, after receiving the content packets, P2PReceiver serving as the sharing pulling module assembles the content packet into Frame1 and Frame2, and inputs Frame1 and Frame2 into Jitterbuffer of P2PReceiver for output rendering (OutputFrame). For the first terminal device, CDNReceiver also inputs Frame1 and Frame2 obtained through assembly into Jitterbuffer of CDNReceiver for output rendering (OutputFrame).

Based on the foregoing embodiments corresponding to FIG. 1 to FIG. 5, FIG. 6 is an apparatus structural diagram of a first terminal device for data processing according to an embodiment of this application. The first terminal device 600 includes an acquisition unit 601, a transmission unit 602, and a playing unit 603.

The acquisition unit 601 is configured to acquire a content packet of first target content from a resource server, the first terminal device being an access node of a content delivery network, the resource server being a server in the content delivery network configured to provide the first target content for the first terminal device.

The transmission unit 602 is configured to transmit the content packet to a second terminal device through a data connection with the second terminal device, the second terminal device being an access node of the content delivery network, and the second terminal device initiating an acquisition request for the first target content.

The acquisition unit 601 is further configured to obtain a content picture frame of the first target content based on the content packet.

The playing unit 603 is configured to display the content picture frame of the first target content, to play the first target content.

In a possible implementation, the acquisition unit is further configured to obtain, when acquiring all content packets for the content picture frame, the content picture frame of the first target content based on the all content packets.

In a possible implementation, the transmission unit is further configured to transmit a data sharing request to the second terminal device, the data sharing request being configured for identifying the first terminal device as a data sharing provider corresponding to the first target content; the acquisition unit is further configured to acquire a data sharing response of the second terminal device; and the transmission unit is further configured to: when the data sharing response indicates that the second terminal device receives sharing, transmit the content packet to the second terminal device through the data connection with the second terminal device.

In a possible implementation, the transmission unit is further configured to transmit the data sharing request to the second terminal device through a seed server in the content delivery network; and the acquisition unit is further configured to acquire the data sharing response of the second terminal device through the seed server.

In a possible implementation, the first terminal device further includes a test unit, and the test unit is configured to:

perform a connectivity test on the second terminal device; and establish the data connection with the second terminal device if a test result of the connectivity test indicates that the second terminal device meets a connection condition.

In a possible implementation, the acquisition unit is further configured to acquire a sharing list corresponding to the first target content, the sharing list including an identification information set of a terminal device in the content delivery network that requests to acquire the first target content, the identification information set including identification information of the second terminal device; and the transmission unit is further configured to transmit the content packet to the second terminal device through the data connection with the second terminal device based on the sharing list.

In a possible implementation, the transmission unit is further configured to transmit feedback information to the seed server in the content delivery network, the feedback information including identification information of the first target content and identification information of the first terminal device, and the feedback information being configured for indicating the seed server to generate the sharing list based on the feedback information.

In a possible implementation, the acquisition unit is further configured to:

acquire a content packet of second target content from the resource server;

acquire the content packet of the second target content from a third terminal device through a data connection with the third terminal device, the third terminal device being an access node of the content delivery network; and disconnect the data connection with the resource server for transmitting the content packet of the second target content.

In a possible implementation, the acquisition unit is further configured to disconnect, in response to acquiring all content packets of one content picture frame of the second target content from the third terminal device, the data connection with the resource server for transmitting the content packet of the second target content.

In a possible implementation, the playing unit is further configured to:

load the content picture frame of the first target content into a buffer; and read and display the content picture frame of the first target content sequentially from the buffer, to play the first target content.

In a possible implementation, the first target content is live streaming content for a target live streaming room.

In the content delivery network including the first terminal device, the second terminal device, and the resource server, when the first target content needs to be viewed through the first terminal device, the first terminal device can acquire the content packet of the first target content from the resource server. For the second terminal device that also initiates the acquisition request for the first target content, due to the data connection between the first terminal device and the second terminal device, to reduce bandwidth consumption of the content delivery network, the first terminal device can push the content packet acquired from the resource server to the second terminal device through the data connection, so that the second terminal device obtains the content picture frame of the first target content through the content packet. By decoupling frame rendering and data sharing, the timing for the first terminal device to push the content packet no longer depends on whether the first terminal device has obtained the content picture frame based on the content packet and rendered the content picture frame. In other words, the first terminal device can quickly and directly push the content packet to the second terminal device without waiting for itself to complete generation and rendering of the content picture frame, thereby greatly improving the efficiency of data sharing between terminal devices. The latency between the first target content viewed through the second terminal device and the first target content viewed through the first terminal device is effectively reduced, which provides strong transmission support for scenarios with a high real-time requirement.

An embodiment of this application further provides a computer device. The computer device is the foregoing computer device, and may include a terminal device or a server. The foregoing first terminal device for data processing may be configured in the computer device. The following describes the computer device with reference to the accompanying drawings.

Figure 7:
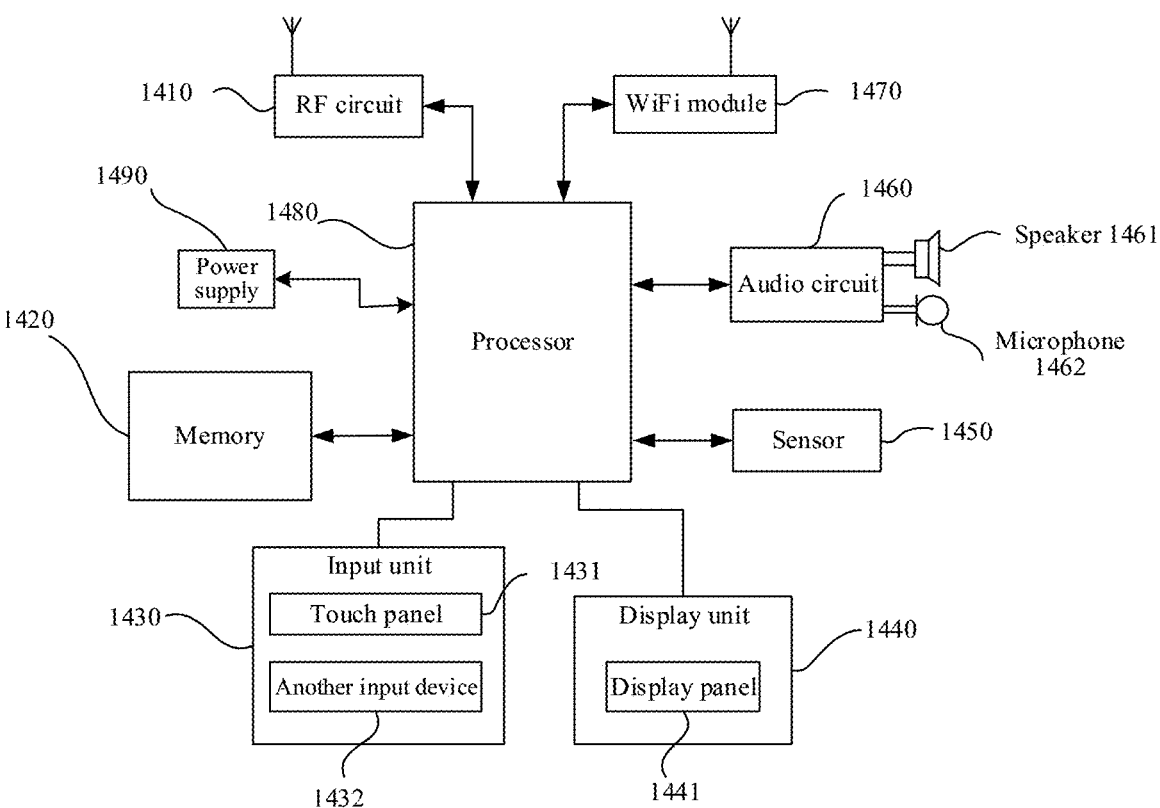
FIG. 7 is a structural diagram of a terminal device according to an embodiment of this application.

If the computer device is a terminal device, referring to FIG. 7, an embodiment of this application provides a terminal device, and an example in which the terminal device is a mobile phone is used.

FIG. 7 is a block diagram of a partial structure of a mobile phone related to the terminal device according to an embodiment of this application. As shown in FIG. 7, the mobile phone includes components such as a radio frequency (RF) circuit 1410, a memory 1420, an input unit 1430, a display unit 1440, a sensor 1450, an audio circuit 1460, a wireless fidelity (WiFi) module 1470, a processor 1480, and a power supply 1490. A person skilled in the art may understand that the structure of the mobile phone shown in FIG. 7 does not constitute a limitation to the mobile phone, and the mobile phone may include more or fewer components than those shown in the figure, or some components may be combined, or a different component deployment may be used.

The following describes the components of the mobile phone in detail with reference to FIG. 7.

The RF circuit 1410 may be configured to receive and transmit signals during an information receiving and transmission process or a call process. Specifically, the RF circuit 1410 receives downlink information from a base station, then delivers the downlink information to the processor 1480 for processing, and transmits designed uplink data to the base station.

The memory 1420 may be configured to store a software program and a module. The processor 1480 runs the software program and the module stored in the memory 1420, to perform various functional applications of the mobile phone and data processing. The memory 1420 may mainly include a program storage area and a data storage area. The program storage area may store an operating system, an application program required by at least one function (such as a sound playback function and an image display function), and the like. The data storage area may store data (such as audio data and an address book) created based on use of the mobile phone, and the like. In addition, the memory 1420 may include a high speed random access memory, and may further include a non-volatile memory, for example, at least one magnetic disk storage device, a flash memory, or another volatile solid-state storage device.

The input unit 1430 may be configured to receive input digit or character information, and generate a keyboard signal input related to a user setting and function control of the mobile phone. Specifically, the input unit 1430 may include a touch panel 1431 and another input device 1432.

The display unit 1440 may be configured to display information input by the user or information provided for the user, and various menus of the mobile phone. The display unit 1440 may include a display panel 1441.

The mobile phone may further include at least one sensor 1450, for example, an optical sensor, a motion sensor, and other sensors.

The audio circuit 1460, a speaker 1461, and a microphone 1462 may provide audio interfaces between the user and the mobile phone.

WiFi belongs to a short distance wireless transmission technology. The mobile phone may help, by using the WiFi module 1470, the user to receive and transmit an email, browse a web page, access streaming media, and the like. This provides wireless broadband Internet access for the user.

The processor 1480 is a control center of the mobile phone, and is connected to various parts of the entire mobile phone by using various interfaces and lines. By running or executing a software program and/or module stored in the memory 1420, and invoking data stored in the memory 1420, the processor 1480 executes various functions of the mobile phone and performs data processing.

The mobile phone further includes the power supply 1490 (such as a battery) for supplying power to the components.

In this embodiment, the processor 1480 included in the terminal device is further configured to perform the data processing method provided in the embodiments of this application.

Figure 8:
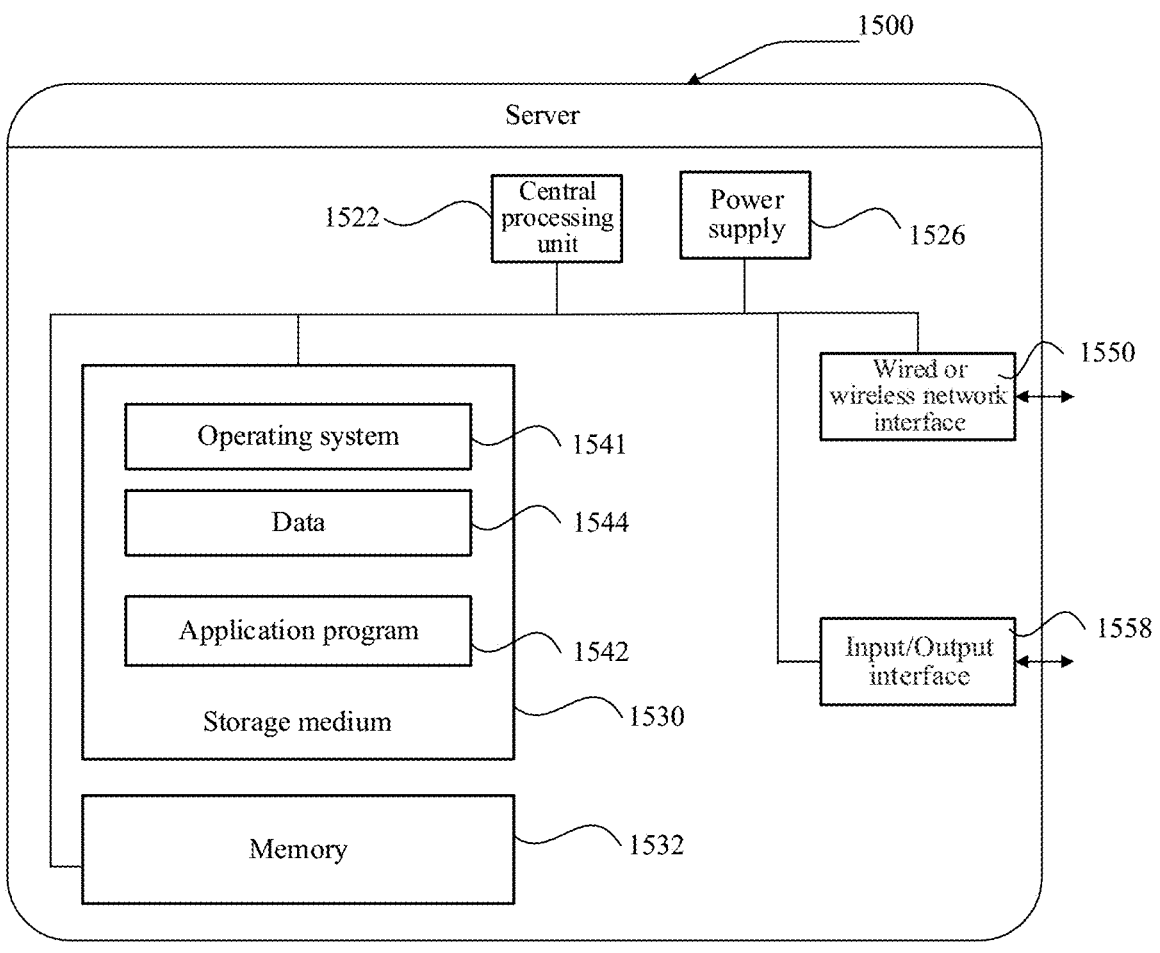
FIG. 8 is a structural diagram of a server according to an embodiment of this application.

If the computer device is a server, an embodiment of this application further provides a server. FIG. 8 is a structural diagram of a server 1500 according to an embodiment of this application. The server 1500 greatly differs due to different configurations or performance, and may include one or more central processing units (CPUs) 1522 (for example, one or more processors), a memory 1532, and one or more storage media 1530 (for example, one or more mass storage devices) for storing an application program 1542 or data 1544. The memory 1532 and the storage medium 1530 may be transient storage or persistent storage. A program stored in the storage medium 1530 may include one or more modules (not shown in the figure), and each module may include a series of instruction operations on the server. Further, the central processing unit 1522 is configured to communicate with the storage medium 1530, and perform the series of instruction operations in the storage medium 1530 on the server 1500.

The server 1500 may further include one or more power supplies 1526, one or more wired or wireless network interfaces 1550, one or more input/output interfaces 1558, and/or one or more operating systems 1541, for example, Windows Server™, Mac OS X™, Unix™, Linux™, and FreeBSD™.

The operations performed by the server in the foregoing embodiment may be based on the structure of the server shown in FIG. 8.

In addition, an embodiment of this application further provides a storage medium. The storage medium is configured to store a program, where the computer program is configured to perform the method provided in the foregoing embodiments.

An embodiment of this application further provides a computer program product including instructions. The instructions, when run on a computer, cause the computer to perform the method provided in the foregoing embodiments.

A person of ordinary skill in the art may understand that all or some of the operations of the foregoing method embodiments may be implemented by a program instructing related hardware. The program may be stored in a computer-readable storage medium. The program, when run, performs the operations of the foregoing method embodiments. The foregoing storage medium may be at least one of the following media that can store program code, for example, a read-only memory (ROM), a RAM, a magnetic disk, or an optical disc.

The embodiments in this specification are all described in a progressive manner, mutual reference may be made to the same or similar part of the embodiments, and each embodiment focuses on illustrating a difference from other embodiments. Particularly, the device and the system embodiments are basically similar to the method embodiments, and therefore are described briefly. For related parts, reference may be made to partial descriptions in the method embodiments. The foregoing described device and system embodiments are merely exemplary. The units described as separate components may or may be not physically separated, and the components displayed as units may or may not be physical units, that is, may be located at one position or distributed on a plurality of network units. Some or all of the modules may be selected based on certain needs to achieve the purpose of the solutions of the embodiments. A person of ordinary skill in the art may understand and implement the solutions of the embodiments without creative efforts.

The foregoing descriptions are merely specific implementations of this application, but are not intended to limit the protection scope of this application. Any variation or replacement readily figured out by a person skilled in the art within the technical scope disclosed in this application shall fall within the protection scope of this application. In this application, based on the implementations provided in the foregoing aspects, the implementations may be further combined to provide more implementations. Therefore, the protection scope of this application shall be subject to the protection scope of the claims.

What is claimed is:

1. A data processing method, performed by a first terminal device, the first terminal device being an access node of a content delivery network, and the method comprising:

acquiring a content packet of first target content from a resource server, the resource server being a server in the content delivery network configured to provide the first target content to the first terminal device;

transmitting the content packet to a second terminal device through a data connection with the second terminal device, the second terminal device being an access node of the content delivery network, and second terminal device initiating an acquisition request for the first target content;

obtaining a content picture frame of the first target content based on the content packet; and displaying the content picture frame of the first target content.

2. The method according to claim 1, wherein the obtaining a content picture frame of the first target content based on the content packet comprises:

obtaining, when acquiring all content packets for the content picture frame, the content picture frame of the first target content based on the all content packets.

3. The method according to claim 1, wherein the method further comprises:

transmitting a data sharing request to the second terminal device, the data sharing request being configured for identifying the first terminal device as a data sharing provider corresponding to the first target content;

acquiring a data sharing response from the second terminal device; and when the data sharing response indicates that the second terminal device accepts sharing, transmitting the content packet to the second terminal device through a data connection with the second terminal device.

4. The method according to claim 3, wherein the transmitting a data sharing request to the second terminal device comprises:

transmitting the data sharing request to the second terminal device through a seed server in the content delivery network; and the acquiring a data sharing response of the second terminal device comprises:

acquiring the data sharing response of the second terminal device through the seed server.

5. The method according to claim 1, wherein the method further comprises:

performing a connectivity test on the second terminal device; and connecting to the second terminal device if a test result of the connectivity test indicates that the second terminal device meets a connection condition.

6. The method according to claim 1, wherein the method further comprises:

acquiring a sharing list corresponding to the first target content, the sharing list comprising an identification information set of a terminal device in the content delivery network that requests to acquire the first target content, the identification information set comprising identification information of the second terminal device; and the transmitting the content packet to a second terminal device through a data connection with the second terminal device comprises:

transmitting the content packet to the second terminal device through the data connection with the second terminal device based on the sharing list.

7. The method according to claim 6, wherein before the acquiring a sharing list corresponding to the first target content, the method further comprises:

transmitting feedback information to the seed server in the content delivery network, the feedback information comprising identification information of the first target content and identification information of the first terminal device, and the feedback information being configured for indicating the seed server to generate the sharing list based on the feedback information.

8. The method according to claim 1, wherein the method further comprises:

acquiring a content packet of second target content from the resource server;

acquiring the content packet of the second target content from a third terminal device through a data connection with the third terminal device, the third terminal device being an access node of the content delivery network; and disconnecting with the resource server for transmitting the content packet of the second target content.

9. The method according to claim 8, wherein the disconnecting with the resource server for transmitting the content packet of the second target content comprises:

disconnecting, in response to acquiring all content packets of one content picture frame of the second target content from the third terminal device, the data connection with the resource server for transmitting the content packet of the second target content.

10. The method according to claim 1, wherein the method further comprises:

loading the content picture frame of the first target content into a buffer; and the displaying the content picture frame of the first target content comprises:

reading and displaying the content picture frame of the first target content sequentially from the buffer, to play the first target content.

11. The method according to claim 1, wherein the first target content is live streaming content for a target live streaming room.

12. A computer device, comprising a processor and a memory:

the memory being configured to store program code and transmit the program code to the processor; and the processor being configured to perform a data processing method, comprising:

acquiring a content packet of first target content from a resource server, by the computer device, the computer device being an access node of a content delivery network, the resource server being a server in the content delivery network configured to provide the first target content to the computer device;

transmitting the content packet to a second terminal device through a data connection with the second terminal device, the second terminal device being an access node of the content delivery network, and the second terminal device initiating an acquisition request for the first target content;

obtaining a content picture frame of the first target content based on the content packet; and displaying the content picture frame of the first target content.

13. The computer device according to claim 12, wherein the obtaining a content picture frame of the first target content based on the content packet comprises:

obtaining, when acquiring all content packets for the content picture frame, the content picture frame of the first target content based on the all content packets.

14. The computer device according to claim 12, wherein the method further comprises:

transmitting a data sharing request to the second terminal device, the data sharing request being configured for identifying the computer device as a data sharing provider corresponding to the first target content;

acquiring a data sharing response from the second terminal device; and when the data sharing response indicates that the second terminal device accepts sharing, transmitting the content packet to the second terminal device through a data connection with the second terminal device.

15. The computer device according to claim 14, wherein the transmitting a data sharing request to the second terminal device comprises:

transmitting the data sharing request to the second terminal device through a seed server in the content delivery network; and the acquiring a data sharing response of the second terminal device comprises:

acquiring the data sharing response of the second terminal device through the seed server.

16. The computer device according to claim 12, wherein the method further comprises:

performing a connectivity test on the second terminal device; and connecting to the second terminal device if a test result of the connectivity test indicates that the second terminal device meets a connection condition.

17. The computer device according to claim 12, wherein the method further comprises:

acquiring a sharing list corresponding to the first target content, the sharing list comprising an identification information set of a terminal device in the content delivery network that requests to acquire the first target content, the identification information set comprising identification information of the second terminal device; and the transmitting the content packet to a second terminal device through a data connection with the second terminal device comprises:

transmitting the content packet to the second terminal device through the data connection with the second terminal device based on the sharing list.

18. The computer device according to claim 17, wherein before the acquiring a sharing list corresponding to the first target content, the method further comprises:

transmitting feedback information to the seed server in the content delivery network, the feedback information comprising identification information of the first target content and identification information of the computer device, and the feedback information being configured for indicating the seed server to generate the sharing list based on the feedback information.

19. A non-transitory computer-readable storage medium of a first terminal device, the first terminal device being an access node of a content delivery network, the computer-readable storage medium being configured to store a computer program, when executed by one or more processors, the computer program being configured to perform a data processing method, and the method comprising:

acquiring a content packet of first target content from a resource server, the resource server being a server in the content delivery network configured to provide the first target content to the first terminal device;

transmitting the content packet to a second terminal device through a data connection with the second terminal device, the second terminal device being an access node of the content delivery network, and the second terminal device initiating an acquisition request for the first target content;

obtaining a content picture frame of the first target content based on the content packet; and displaying the content picture frame of the first target content.

20. The computer-readable storage medium according to claim 19, wherein the obtaining a content picture frame of the first target content based on the content packet comprises:

obtaining, when acquiring all content packets for the content picture frame, the content picture frame of the first target content based on the all content packets.

* * * * *